United States Patent
Qian et al.

(10) Patent No.: US 12,238,403 B2
(45) Date of Patent: Feb. 25, 2025

(54) PHOTOGRAPHING CONTROL METHOD, APPARATUS, AND CONTROL DEVICE

(71) Applicant: SZ DJI TECHNOLOGY CO., LTD., Shenzhen (CN)

(72) Inventors: Jie Qian, Shenzhen (CN); Haonan Li, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/544,884

(22) Filed: Dec. 19, 2023

(65) Prior Publication Data
US 2024/0155219 A1 May 9, 2024

Related U.S. Application Data

(63) Continuation of application No. 18/164,811, filed on Feb. 6, 2023, now Pat. No. 11,863,857, which is a
(Continued)

(51) Int. Cl.
*H04N 5/232* (2006.01)
*G06T 7/70* (2017.01)
(Continued)

(52) U.S. Cl.
CPC .............. *H04N 23/61* (2023.01); *G06T 7/70* (2017.01); *G06V 10/40* (2022.01); *H04N 23/60* (2023.01);
(Continued)

(58) Field of Classification Search
CPC ............... H04N 5/23218; H04N 5/232; H04N 5/232945; H04N 5/23248; H04N 5/23296;
(Continued)

(56) References Cited

U.S. PATENT DOCUMENTS 8,078,395 B2   12/2011  Builta et al.
9,977,434 B2 *  5/2018  Mellinger, III ...... G05D 1/0094
(Continued)

FOREIGN PATENT DOCUMENTS

CN   104243796 A   12/2014
CN   104881650 A    9/2015
(Continued)

OTHER PUBLICATIONS

World Intellectual Property Organization (WIPO) International Search Report for PCT/CN2016/108446 Sep. 6, 2017 6 pages.
(Continued)

*Primary Examiner* — Hung H Lam
(74) *Attorney, Agent, or Firm* — ANOVA LAW GROUP, PLLC

(57) ABSTRACT

A method includes obtaining a photographed image from a photographing device carried by a movable object, determining a target object in the photographed image to track the target object, determining location estimation information of the target object based on shooting information of the photographing device, and in response to a disappearance of the target object in the photographed image, controlling the photographing device to search for the target object around a location associated with the location estimation information.

20 Claims, 6 Drawing Sheets

Related U.S. Application Data continuation of application No. 17/151,335, filed on Jan. 18, 2021, now Pat. No. 11,575,824, which is a continuation of application No. 16/426,975, filed on May 30, 2019, now Pat. No. 10,897,569, which is a continuation of application No. PCT/CN2016/108446, filed on Dec. 2, 2016.

(51) Int. Cl.
| | |
|---|---|
| G06V 10/40 | (2022.01) |
| H04N 23/60 | (2023.01) |
| H04N 23/61 | (2023.01) |
| H04N 23/63 | (2023.01) |
| H04N 23/68 | (2023.01) |
| H04N 23/69 | (2023.01) |

(52) U.S. Cl.
CPC ........... *H04N 23/635* (2023.01); *H04N 23/68* (2023.01); *H04N 23/69* (2023.01)

(58) Field of Classification Search
CPC .. H04N 5/23299; H04N 5/23225; G06K 9/46; G06T 7/70
See application file for complete search history.

(56) References Cited

U.S. PATENT DOCUMENTS

| | | | |
|---|---|---|---|
| 10,574,881 B2 | 2/2020 | Oleson et al. | |
| 11,438,505 B2 * | 9/2022 | Okumura | H04N 23/665 |
| 11,783,553 B2 * | 10/2023 | Friesenhahn | G06T 19/003 |
| | | | 345/633 |
| 2009/0010495 A1 * | 1/2009 | Schamp | G06F 18/254 |
| | | | 382/106 |
| 2014/0247325 A1 | 9/2014 | Wu et al. | |
| 2016/0205308 A1 | 7/2016 | Maeda | |
| 2016/0286132 A1 | 9/2016 | Kim et al. | |
| 2017/0320570 A1 | 11/2017 | Horn | |
| 2018/0089622 A1 | 3/2018 | Burch et al. | |
| 2018/0295335 A1 | 10/2018 | Burgess | |
| 2019/0258264 A1 | 8/2019 | Bash et al. | |
| 2020/0047648 A1 | 2/2020 | Line et al. | |
| 2020/0348697 A1 | 11/2020 | Kuhara | |
| 2021/0061465 A1 | 3/2021 | Kaneda | |
| 2021/0357620 A1 | 11/2021 | Kyochika et al. | |

FOREIGN PATENT DOCUMENTS

| | | |
|---|---|---|
| CN | 105353772 A | 2/2016 |
| CN | 105979133 A | 9/2016 |
| KR | 20120119144 A | 10/2012 |
| WO | 2016162973 A1 | 10/2016 |

OTHER PUBLICATIONS

Wei Liu et al., "Target Feature Model and Visual Attention Model in Computer Vision," p. 7-11, Sep. 30, 2016.

* cited by examiner

PHOTOGRAPHING CONTROL METHOD, APPARATUS, AND CONTROL DEVICE

CROSS-REFERENCE TO RELATED APPLICATIONS

This application is a continuation of U.S. application Ser. No. 18/164,811, filed on Feb. 6, 2023, which is a continuation of U.S. application Ser. No. 17/151,335, filed on Jan. 18, 2021, now U.S. Pat. No. 11,575,824, which is a continuation of U.S. application Ser. No. 16/426,975, filed on May 30, 2019, now U.S. Pat. No. 10,897,569, which is a continuation of International Application No. PCT/CN2016/108446, filed on Dec. 2, 2016, the entire contents of all of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to automatic control technology and, more particularly, to a photographing control method, a control apparatus, and a control device.

BACKGROUND

As optics and electronics technologies advance, various photographing devices such as cameras and camcorders emerge in the market. People use the photographing devices to photograph images of various objects. When the photographing device is mounted on a movable object, such as an unmanned aerial vehicle or other intelligent flying equipment, the photographing device can monitor a target object. The monitoring refers to that, no matter how the movable object carrying the photographing device moves, the photographing device can always photograph the target object that requires continuous monitoring.

For the above described monitoring, the existing solution mainly includes an image recognition technology. Based on the image recognition technology, the photographing device collects features such as grayscale and texture from an image area where the target object is located, and determines a location of the target object. When the movable object carrying the photographing device is moving, the determined location of the target object is used to adjust the shooting angle of the photographing device to photograph new images for further image recognition. Thus, the continuous monitoring of the target object is achieved.

However, the image recognition technology based on features such as grayscale and texture is relatively complex, and requires expensive software and hardware to support the operation. Moreover, when the monitored target object appears to be shielded, the image recognition technology is unable to recognize the target object, thereby causing operation failures.

SUMMARY

In accordance with the disclosure, there is provided a photographing control method including obtaining a plurality sets of shooting information including shooting location information and shooting angle information for a target object, and determining location estimation information for the target object based on at least two sets of shooting information selected from the plurality sets of shooting information. The shooting location information in the at least two sets of shooting information corresponds to different locations. The method further includes generating a shooting adjustment instruction based on the location estimation information, and adjusting a shooting angle of a photographing device according to the shooting adjustment instruction to place a location corresponding to the location estimation information within a viewing angle of the photographing device.

Also in accordance with the disclosure, there is provided a control device including a processor and an output interface. The processor is configured to obtain a plurality sets of shooting information including shooting location information and shooting angle information for a target object, and determine location estimation information for the target object based on at least two sets of shooting information selected from the plurality sets of shooting information. The shooting location information in the at least two sets of shooting information corresponds to different locations. The processor is further configured to generate a shooting adjustment instruction based on the location estimation information. The output interface is configured to output the adjustment instruction to adjust a shooting angle of a photographing device to place a location corresponding to the location estimation information within a viewing angle of the photographing device.

BRIEF DESCRIPTION OF THE DRAWINGS

To more clearly illustrate the technical solutions of the present disclosure, the accompanying drawings to be used in the description of the disclosed embodiments are briefly described hereinafter. The drawings in the following descriptions are merely certain embodiments of the present disclosure. For those of ordinary skill in the art, other drawings may also be obtained according to these drawings without creative effort.

DETAILED DESCRIPTION OF THE EMBODIMENTS

Figure 1:
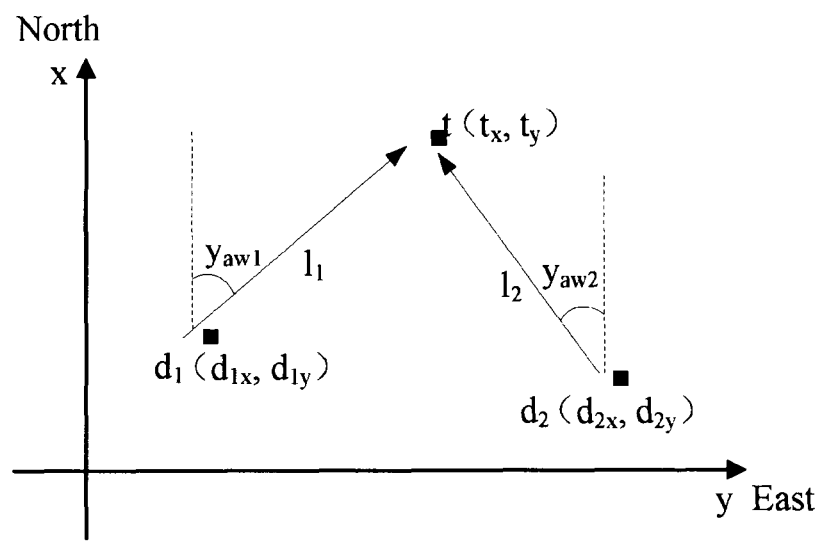
FIG. 1 is a schematic diagram of an example location coordinates according to some embodiments of the present disclosure.

Hereinafter, embodiments consistent with the present disclosure will be described clearly and completely with reference to drawings. Obviously, the embodiments described are only some but not all of the embodiments. Based on the disclosed embodiments and without contributing creative efforts, those having ordinary skill in the art may obtain other embodiments without departing from the scope of the present disclosure.

In some embodiments, monitoring a target object can be achieved by mounting a photographing device on a movable object. The movable object may be an unmanned aerial vehicle (UAV), an auto-driving car, or a moving robot, etc. The movable object may include a gimbal to carry the photographing device. To photograph images continuously from various angles, the gimbal may be a three-axis gimbal. The gimbal may rotate on a yaw axis, a pitch axis, and a roll axis. Controlling rotation angles that the gimbal rotates on one or more axes may ensure the photographing device to continuously photograph images of the target object when the movable object such as an unmanned aerial vehicle is moving to any location or any attitude.

The images that are photographed by the photographing device and contain the target object may be uploaded to a ground terminal device through a wireless communication link. For example, the images photographed by the photographing device mounted on the unmanned aerial vehicle and containing the target object may be uploaded to a smart phone, a tablet computer, or other smart terminal, through a wireless communication link. The wireless communication link is established between the smart terminal and the unmanned aerial vehicle or the photographing device before the smart terminal is able to receive the images containing the target object.

The target object may be an object specified by a user, for example, an object in the background. The photographing device may send the photographed images to a user interface for displaying. The user may perform a click operation on the image displayed on the user interface to select an object as the target object. For example, the user may select a tree, an animal, or an object in a certain area as the target object. Obviously, the user may also enter image features of a certain object, such as features of a human face or outline features of a certain object. The entered features may be processed by a processing circuit accordingly to identify a person or an object matching the entered image features. Thus, the identified person or object may be photographed as the target object.

In some embodiments, the target object may be a still object or an object that does not move during a period of time of continuous photographing. The target object may also be an object that moves during continuous photographing at a speed substantially slower than the movement of the unmanned aerial vehicle, for example, a difference in speed between the target object and the unmanned aerial vehicle is smaller than a pre-configured threshold.

In some embodiments, after the target object is photographed in the image and during the movement of the unmanned aerial vehicle carrying the photographing device, the image recognition technology is used to analyze and recognize the image. In particular, the image recognition is performed on each and every photographed image based on features such as grayscale and texture to identify the target object to continuously photograph the target object.

During the continuous photographing of the target object, the target object may disappear. There are many factors that cause the disappearance of the target object. In particular, after the target object is shielded by another object, the image recognition based on features such as grayscale and texture is unable to identify the target object, thereby resulting in the disappearance of the target object. Further, the unmanned aerial vehicle or the movable object may move to a location far away from the target object, such that the features such as grayscale and texture in the images of the target object are insufficient for an image recognition circuit to recognize the target object. As a result, the target object disappears. The target object may disappear due to other reasons. For example, when bright light irradiates on the lens of the photographing device, features such as grayscale and texture in the images of the target object may be obscured. In another example, the image recognition circuit may be faulty. It should be noted that the disappearance of the target object refers to that the target object cannot be determined in the images of the target object.

In some embodiments, when the image of the target object is detected to be satisfactory, shooting information when the image is photographed may be recorded. In particular, a condition of a satisfactory target object image refers to that for a photographed image, the image recognition technology is able to correctly recognize the target object in the image. The shooting information recorded when the image is photographed includes shooting location information and shooting angle information. The shooting location information refers to the location information of the photographing device when the photographing device photographs the target object. The shooting location information, e.g., GPS coordinate, may be used to locate the movable object carrying the photographing device. The shooting angle information refers to orientation of the target object relative to the photographing device when the photographing device photographs the target object. The orientation may be determined by combining attitude angles of the gimbal (e.g., a yaw angle and a pitch angle of the gimbal) and a display position of the target object in the photographed image.

In some embodiments, when the movable object carrying the photographing device is moving, at least two images satisfying the condition need to be detected, and the corresponding shooting information needs to be recorded. The recorded shooting information may form an information collection. Based on the information collection, the location estimation information of the target object may be calculated. When the target object disappears or it is needed to photograph the target object directly based on the location, the location estimation information may facilitate the user's need to continuously photograph the target object. In some embodiments, the shooting location information in the shooting information sets of the information collection correspond to different locations.

In some embodiments, the photographing device is mounted on the movable object through a gimbal. The shooting location information includes the collected location coordinate of the movable object. The shooting angle information includes the angle calculated from the attitude information of the gimbal and the position information of the target object in the photographed image. In particular, for the shooting angle information, if the target object is located in a center area of the photographed image when the target object is photographed, the pitch angle in the shooting angle information can be the pitch angle of the gimbal, and the yaw angle in the shooting angle information can be the yaw angle of the gimbal.

If the target object is not located in a center area of the photographed image when the target object is photographed, a pixel distance dp1 from the center of the target object to an X-axis of the image physical coordinate system and a magnitude of a horizontal viewing angle may be used to determine a displacement angle of the target object with respect to the X-axis relative to the image center. And a pixel distance dp2 from the center of the target object to a Y-axis of the image physical coordinate system and a magnitude of a vertical viewing angle may be used to determine a displacement angle of the target object with respect to the Y-axis relative to the image center. The pitch angle in the shooting angle information may be the pitch angle of the gimbal plus the displacement angle with respect to the X-axis. The yaw angle in the shooting angle information may be the yaw angle of the gimbal plus the displacement angle with respect to the Y-axis.

Figure 2A:
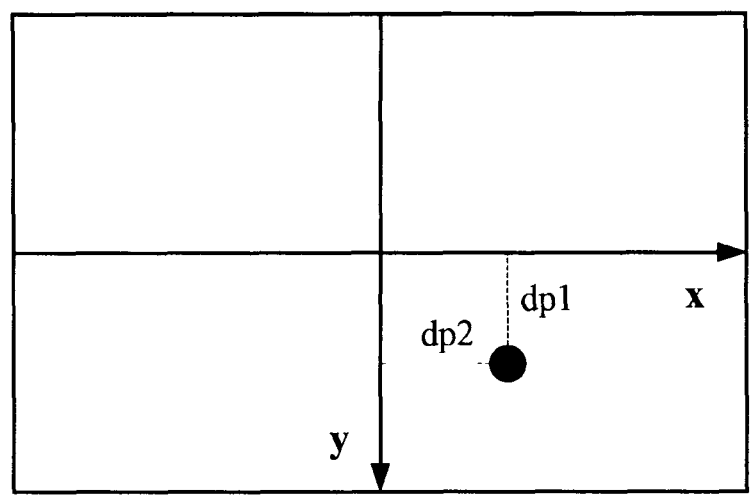
FIG. 2A is a schematic diagram of an example image coordinate and viewing angle system according to some embodiments of the present disclosure.
Figure 2B:
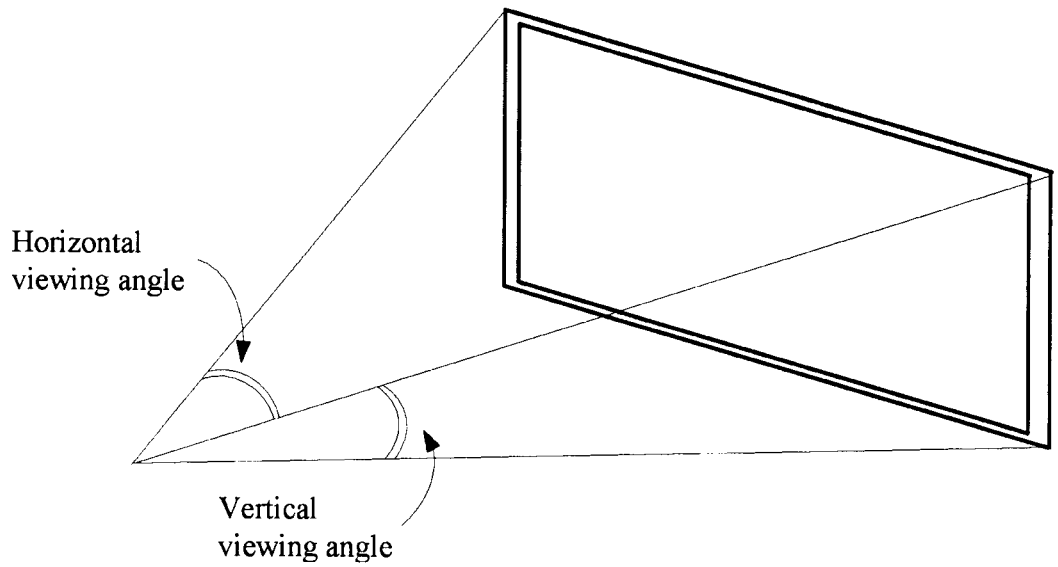
FIG. 2B is a schematic diagram of an example viewing angle according to some embodiments of the present disclosure.

FIG. 2A and FIG. 2B illustrate the image physical coordinate system, the horizontal viewing angle and the vertical viewing angle of the photographing device. Ratios of the pixel distance from the center of the target object to the X-axis and the Y-axis respectively over the full pixel distances in the X-axis and the Y-axis respectively and the corresponding viewing angles may be used to determine the displacement angle with respect to the X-axis and the displacement angle with respect to the Y-axis.

After the information collection is obtained, it may be needed to continuously photograph the target object based on the position of the target object. For example, the image recognition may be unable to recognize the target object, or the condition for the position-based continuous photographing is satisfied. In this case, at least two sets of the shooting information may be selected from the information collection. The rule for selecting the at least two sets of the shooting information from the information collection includes that the shooting location information in the shooting information is used to calculate a separation distance to select the shooting information, and/or the shooting angle information in the shooting information is used to calculate a separation angle to select the shooting information. The satisfactory condition for the position-based continuous photographing may include receiving a control instruction for the position-based continuous photographing that is sent by the user, or the already recorded information in the information collection is sufficient to correctly calculate the location coordinate of the target object.

In some embodiments, for illustrative purposes, only two sets of shooting information are selected to calculate the location estimation information of the target object. In particular, as shown in FIG. 1, in the North-East coordinate system, the coordinate of the target object is t(tx, ty). In a first selected set of shooting information, the shooting location information is d1(d1x, d1y), and the yaw angle in the shooting angle information is yaw1. In a second selected set of shooting information, the shooting location information is d2(d2x, d2y), and the yaw angle in the shooting angle information is yaw2. Based on the shooting angle information of the two shooting locations, it is calculated that k1=1/tan(yaw1), and k2=1/tan(yaw2). It is further calculated that a distance from d1 to a plane where the target object is located is L1=d1x−k1*d1y, and a distance from d2 to the plane where the target object is located is L2=d2x−k2*d2y.

It is further calculated that the coordinate of the target object is tx=k1*ty+L1, and ty=(L1−L2)/(k2−k1). At the same time, the pitch angle in the shooting angle information of the first set of the shooting information is pitch1, and the pitch angle in the shooting angle information of the second set of the shooting information is pitch2. The estimated heights of the target object are e1z and e2z, where e1z=d1z−L1*tan(pitch1), and e2z=d1z−L2*tan(pitch2). Based on the estimated heights, it is further calculated that the height of the target object is tz=(e1z+e2z)/2. Thus, the three dimensional coordinate of the target object is t(tx, ty, tz).

In some embodiments, the location estimation information of the target object includes the calculated coordinate t. d1 and d2 may be location coordinates collected by a location circuit in the movable object, for example, GPS coordinates obtained by a GPS location circuit in the unmanned aerial vehicle. The yaw angle and the pitch angle of the shooting angle information are calculated from the yaw angle of the gimbal and the distance from the image location of the target object to the image Y-axis, and the pitch angle of the gimbal and the distance from the image location of the target object to the image X-axis, respectively, when the images having recognizable target object are photographed. The specific calculation method may refer to the corresponding description about FIG. 2.

After the location estimation information of the target object is determined, an adjustment instruction for adjusting the shooting angle of the photographing device may be further generated based on a specific location of the movable object and the location estimation information. The specific location refers to any location of the movable object in the process of continuously photographing the target object. The specific location may be determined in various ways. For example, the current location of the movable object may be obtained in real-time as the specific location. Accordingly, the adjustment instruction for adjusting the shooting angle of the photographing device may be generated based on the specific location of the movable object and the location estimation information.

In another example, the current location, the current attitude, and the current speed of the target object may be used to predict a location where the movable object will move to. The predicted location may be used as the specific location. Accordingly, the adjustment instruction may be generated based on the specific location of the movable object and the location estimation information. When the movable object moves to the specific location, the shooting angle of the photographing device may be adjusted according to the adjustment instruction. In another example, the movable object moves along a planned flight path for continuous photographing of the target object. A plurality of locations in the planned flight path may be selected as the specific locations. Adjustment instructions may be generated based the specific locations of the movable object and the location estimation information. When the movable object moves through each specific location in the planned flight path, the corresponding adjustment instruction may be used to adjust the shooting angle of the photographing device.

In some embodiments, the three-dimensional coordinates of the specific location and the three-dimensional coordinates in the location estimation information are used to calculate the yaw angle and the pitch angle. For example, the three-dimensional coordinate of the specific location d is known as d(dx, dy, dz), and the three-dimensional coordinate of the location t corresponding to the location estimation information is known as t(tx, ty, tz). Based on the two coordinates, the adjustment angle may be calculated. First, the coordinate difference between the two locations is calculated: delx=dx−tx, dely=dy−ty, delz=dz−tz. The distance L from the location corresponding to the location estimation information to a plane where the specific location is located is further calculated. A pitch angle of the location corresponding to the location estimation information with respect to the specific location is further obtained: t2d_pitch=arctan (delz/L). A yaw angle of the location corresponding to the location estimation information with respect to the specific location is further obtained: t2d_yaw=arctan(dely/delx). Assuming that the detected yaw angle and pitch angle of the gimbal are gyaw and gpitch, respectively, the angle deviations of the location corresponding to the location estimation information with respect to the specific location are the yaw angle deviation del_yaw=gyaw−t2d_yaw, and the pitch angle deviation del_pitch=gpitch−t2d_pitch. The equation for calculating the distance is $L=\sqrt{del_x*del_x+del_y*del_y}$.

The adjustment instruction is generated based on the calculated yaw angle deviation and pitch angle deviation. The adjustment instruction is used to control the gimbal to rotate according to the yaw angle deviation and the pitch angle deviation with respect to the current yaw angle and pitch angle, such that the object at the location corresponding to the location estimate information falls within a viewing angle of the photographing device. Thus, the photographing device is ensured to photograph the object at the location corresponding to the location estimation information.

In the embodiments of the present disclosure, the methods of calculating the corresponding angles and generating the adjustment instruction are described. The yaw angle and the pitch angle may be correctly adjusted. In some embodiments, the adjustment instruction for adjusting the gimbal may be generated based on the relative position between the specific location and the location corresponding to the location estimation information. For example, based on the relative position, the location corresponding to the location estimation information is determined to be located at a lower right side of the specific location. An adjustment instruction may be generated to adjust the gimbal to make the lens of the photographing device face toward the lower right corner when the movable object arrives at the specific location. To certain extent, it is ensured that the object at the location corresponding to the location estimation information falls within the viewing angle of the photographing device.

Figure 3:
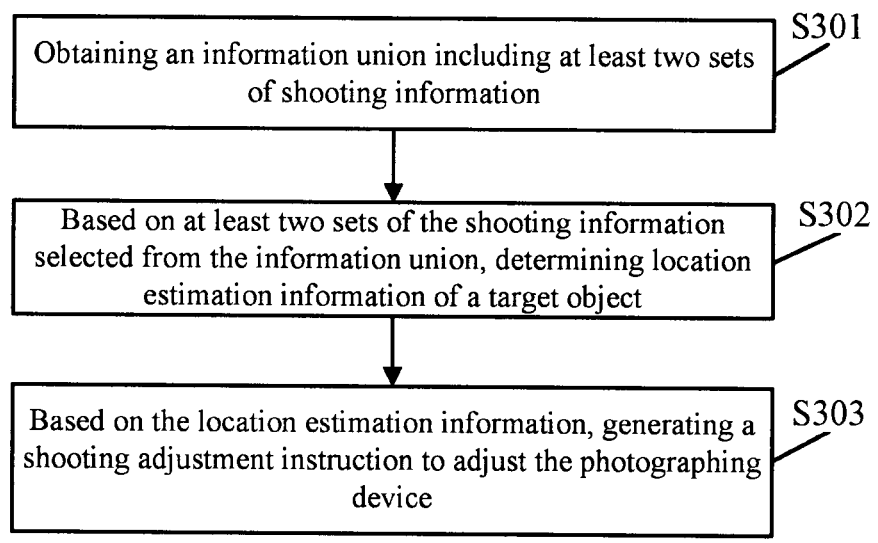
FIG. 3 is a flow chart of an example photographing control method according to some embodiments of the present disclosure.

FIG. 3 is a flow chart of an example photographing control method according to some embodiments of the present disclosure. The method of the present disclosure may be implemented by a specialized control device, a motion controller of the movable object such as a flight controller of an unmanned aerial vehicle, or a gimbal controller. The methods of the present disclosure may be applied to a system including a moving device that moves, a multi-axis rotatable gimbal, and a photographing device that photographs object images. Specifically, the method may include the following processes.

S301: an information collection including at least two sets of the shooting information is obtained, where the shooting information includes the shooting location information and the shooting angle information when the target object is photographed. The information collection may include two sets of the shooting information or more than two sets of the shooting information. The sets of the shooting information in the information collection are collected when the photographing device photographs the target object. In some embodiments, when the target object is able to be recognized by the image recognition process from the images photographed by the photographing device, the shooting location information and the shooting angle information at the moment when the images are photographed may be recorded. When the movable object moves to follow the target object, at least two sets of the shooting information are required.

In some embodiments, the shooting information may be obtained at different positions when a movable object such as an unmanned aerial vehicle moves tangentially relative to the target object. Specifically, when the movable object circles around the target object, the shooting information may be obtained at a certain time interval, at a certain distance interval, or when a central angle between two locations before and after the movement is greater than or equal to a pre-configured angle threshold, to form the information collection.

302: location estimation information of the target object is determined based on at least two sets of the shooting information selected from the information collection, where the shooting location information in different shooting information sets corresponds to different locations.

The rule of selecting the shooting information from the information collection is to ensure to relatively correct calculation of the location estimation information of the target object. The selection may be based on the distance interval calculated from the shooting location information of the shooting information and/or the angle interval calculated from the shooting angle information of the shooting information. For example, if the distance interval between the locations corresponding to the shooting location information of two sets of the shooting information is greater than a pre-configured distance threshold (e.g., 10 meters) and the angle interval between the corresponding angles in the shooting angle information of two sets of the shooting information is greater than a pre-configured angle threshold (e.g., 10 degrees), then the two sets of the shooting information are selected to calculate the location estimation information. For example, as shown in FIG. 1, the two sets of the shooting information are selected where the distance between the locations d1 and d2 corresponding to the two sets of the shooting information is greater than the pre-configured distance threshold and the central angle calculated according to the corresponding yaw angles yaw1 and yaw2 in the two sets of the shooting information is greater than the pre-configured angle threshold. For the method of calculating the location estimation information, reference may be made to the relevant calculation method described above, and description thereof will not be repeated herein.

S303: the photographing device is adjusted according to the shooting adjustment instruction generated based on the location estimation information. The shooting adjustment instruction is used to adjust the shooting angle of the photographing device, such that the location corresponding to the location estimation information falls within the viewing angle of the photographing device. Specifically, the photographing device may be adjusted by rotating the control gimbal. For the method of generating the adjustment instruction, reference may be made to the adjustment instruction generation process described above, and description thereof will not be repeated herein.

In the embodiments of the present disclosure, the shooting location and the shooting angle are used to estimate the location where the photographing device needs to be located to continuously photograph the target object. Based on the calculated location estimation information, the shooting orientation of the photographing module is adjusted. The method is simple and effective in avoiding the problem of the image recognition operation failure due to the target object being shielded. Thus, the efficiency of continuous photographing of the target object is improved.

Figure 4:
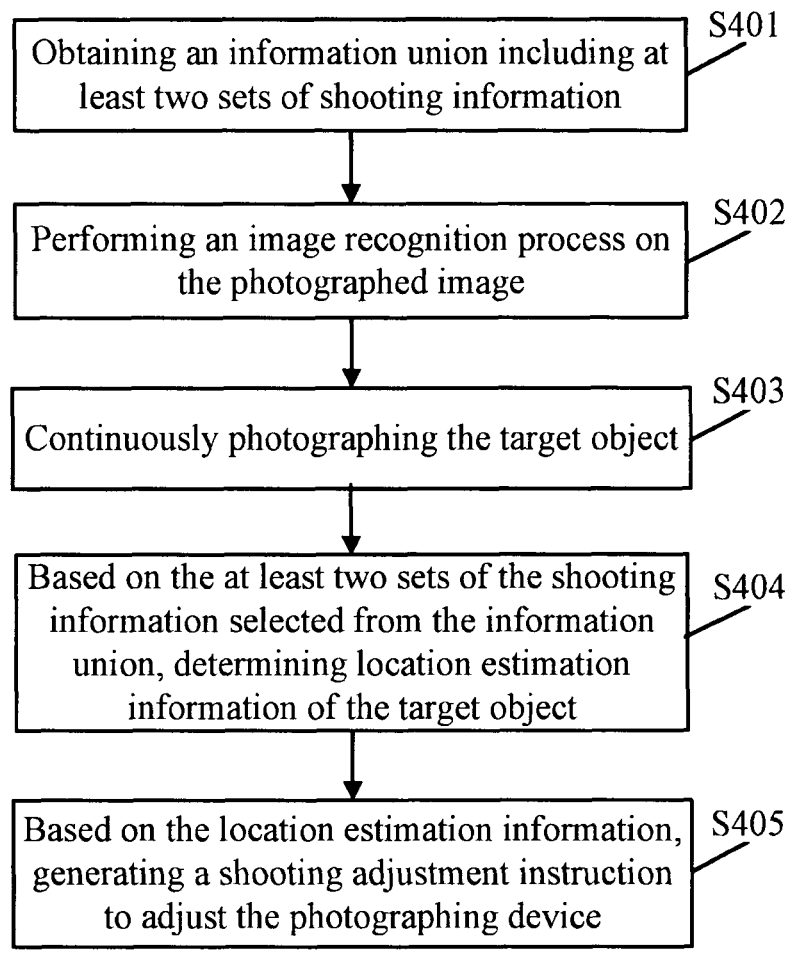
FIG. 4 is a flow chart of another example photographing control method according to some embodiments of the present disclosure.

FIG. 4 is a flow chart of another example photographing control method according to some embodiments of the present disclosure. The method of the present disclosure may be implemented by a specialized control device, a motion controller of the movable object such as a flight controller of an unmanned aerial vehicle, or a gimbal controller. The methods of the present disclosure may be applied to a system including a moving device that moves, a multi-axis rotatable gimbal, and a photographing device that photographs object images. Specifically, the method may include the following processes.

S401: an information collection including at least two sets of shooting information is obtained, where the shooting information includes the shooting location information and the shooting angle information when the target object is photographed.

S402: image recognition process is performed on the photographed images to recognize the target object, based on image features such as grayscale, texture, etc. When the target object is recognized, S403 is executed. When the target object is not recognized, S404 is executed.

S403: the target object is continuously photographed. The image recognition process is performed continuously to identify images containing the target object. The location where the identified image of the target object is photographed is used to adjust the photographing device, such that the subsequently photographed image also includes the target object. In some embodiments, if the target object image position in the current image moves a certain pixel distance relative to the target object image position in the preceding image, then the current shooting angle needs to be adjusted, and the photographing device needs to be rotated upwards, such that the display position of the target object is still substantially the same as the display position of the target object in the preceding image.

S404: location estimation information of the target object is determined based on at least two sets of the shooting information selected from the information collection, where the shooting location information in the shooting information sets correspond to different locations.

In some embodiments, S404 may include determining at least two sets of initial location estimation information of the target object based on at least three sets of shooting information, checking the determined sets of the initial location estimation information against a pre-configured stability condition, and, when the stability condition is satisfied, using the corresponding initial location estimation information to determine the location estimation information of the target object. For example, when at least three sets of shooting information are used to determine initial location estimation information, any two of the at least three sets of the shooting information may be used to determine one set of initial location estimation information. For the method of calculating the initial location estimation information, reference may be made to the method of calculating the location estimation information described above.

In some embodiments, the location estimation information determined at S404 may be any one set randomly selected from a plurality of initial location estimation information sets, or an average value calculated from location coordinates corresponding to a plurality of initial location estimation information sets. The location estimation information may also be determined according to some other rules. For example, the two sets of the initial location estimation information calculated from the two sets of the shooting information that are separated by a farthest distance and/or a largest angle may be determined to be the location estimation information.

In some embodiments, when at least two sets of the initial location estimation information from all sets of the determined initial location estimation information provide a location change magnitude that satisfies a pre-configured location change magnitude, the stability condition is determined to be satisfied. The location change magnitude refers to an interval distance between two locations. The requirement for the satisfactory location change magnitude includes that a plurality of interval distances falls within a pre-configured value range. Based on the location change magnitudes between two or more sets of the initial location estimation information, whether the calculated location estimation of the target object is stable may be determined. The smaller the location change magnitude is, the more accurate the calculated initial location estimation information is. The greater the location change magnitude is, the less accurate the selected sets of the shooting information are, and the less accurate the calculated initial location estimation information is. In this case, the location estimation information may not be accurately determined, the shooting angle may not be properly adjusted according to the location estimation information, and the continuous photographing of the target object may not be supported based on the location estimation information.

Further, there are various scenarios where the location change magnitude between a plurality of initial location estimation information sets is substantially large. For example, in the situation where the target object is not in motion, when the information collection is collected, one or more sets of the shooting location information or the shooting angle information of the shooting information may be inaccurate. As a result, the calculated location estimation information may be inaccurate. Thus, when the location estimation information of the target object is determined, a plurality of initial location estimation information sets may be included in the calculation. For example, a plurality of initial location estimation information sets may be mathematically averaged to obtain an average value as the location estimation information of the target object.

In some embodiments, if the stability condition is not satisfied, other object tracking techniques may be used to identify the target object to perform continuous photographing. For example, more sophisticated image recognition technology may be used to recognize the target object from the photographed images to support the continuous photographing of the target object. In case that the target object cannot be identified, an alert message about the loss of the target may be automatically sent to notify a terminal user.

Further, when the determined initial location estimation information sets satisfy the stability condition, exceptional events may occur. For example, in the situation where the target object is not in motion initially but moves for a distance to a new location when the target object is being continuously photographed, the target object moves a distance to arrive at a new location. Thus, the final determined location estimation information is no longer pertaining to the current location of the target object. If the subsequent adjustment of the photographing device is based on the miscalculated location estimation information, the photographing device is unable to continuously photograph the target object. Thus, in the embodiments of the present disclosure, the method also includes determining whether the target object moves based on the initial location estimation information sets. If the target object moves, then the image recognition technology is needed to continuously photograph the target object. The image recognition technology may be used to recognize the target object from the photographed images. Based on the results of the image recognition process, the photographing device may continuously photograph the target object. If it is determined that the target object moves, S405 is executed.

S405: the photographing device is adjusted according to the shooting adjustment instruction generated based on the location estimation information. The shooting adjustment instruction is used to adjust the shooting angle of the photographing device, such that the location corresponding to the location estimation information falls within the viewing angle of the photographing device.

Figure 5:
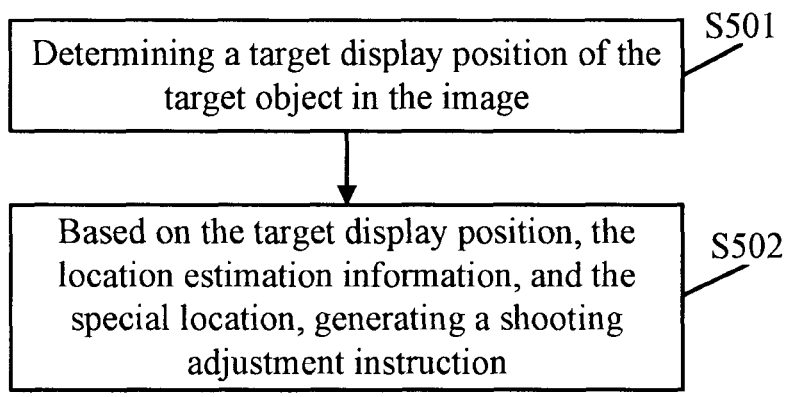
FIG. 5 is a flow chart of an example photographing device adjustment method according to some embodiments of the present disclosure.

In some embodiments, the shooting adjustment instruction is used to adjust the shooting angle of the photographing device at a specific location. FIG. 5 is a flow chart of an example photographing device adjustment method according to some embodiments of the present disclosure. The method shown in FIG. 5 corresponds to S405 with further details. Specifically, the method includes the following processes.

S501: a target display position in the image for the target object is determined. The target display position may refer to a fixed display position that is designated by the user to display the target object. The target display position may also refer to a display position of the target object in the image when the photographing device is switched to continuously photographing the target object based on the location estimation information.

In some embodiments, the target display position may refer to designating a pre-configured image position as the target display position, where the pre-configured image position may be determined by receiving a position selected by the user on an interactive interface.

S502: a shooting adjustment instruction is generated based on target display position, the location estimation information, and the specific location. The shooting adjustment instruction is used to adjust the shooting angle of the photographing device, such that, when the photographing device is at the specific location, the location corresponding to the location estimation information falls within the viewing angle of the photographing device, and the object at the location corresponding to the location estimation information appears at the target display position in the photographed image.

In some embodiments, determining the target display position of the target object in the photographed image includes designating a position in the photographed image as the target display position, and persistently displaying the object at the location corresponding to the location estimation information at the target display position in the photographed image after the shooting angle of the photographing device is adjusted according to the shooting adjustment instruction. For example, the imaged photographed by the photographing device may be displayed on a user interface. The user may designate a target display position on the user interface. When the photographing device is adjusted, it needs to be ensured that the object at the location corresponding to the calculated location estimation information is persistently displayed at the target display position in the photographed image. Designating the target display position may be performed by clicking on the image displayed on the user interface or by dragging a pre-configured selection frame. A user interface may be configured to receive the user operations and display the images photographed by the photographing device.

In some embodiments, determining the target display position of the target object in the photographed image further includes designating a plurality of position points on a trajectory path drawn on the image as the target display positions, where the position points designated as the target display positions include at least a first position point and a second position point. The shooting adjustment instruction generated based on the target display position, the location estimation information and the specific location may include at least a first shooting adjustment instruction corresponding to the first position point and a second shooting adjustment instruction corresponding to the second position point generated based on a pre-configured generation policy, the location estimation information, and the specific location. The first shooting adjustment instruction and the second shooting adjustment instruction are used to adjust the shooting angle of the photographing device, such that the object at the location corresponding to the location estimation information sequentially appears at the first position point and the second position point in the photographed image.

In some embodiments, the pre-configured generation policy is determined by a moving speed of the photographing device, a moving location of the photographing device, and one or more of the position points on the trajectory path, selected as the target display positions. The moving speed and moving location of the photographing device may refer to the moving speed and moving location of the movable object (e.g., an unmanned aerial vehicle) that carries the photographing device.

One objective achieved by a plurality of adjustment instructions generated based on the generation policy may include controlling the speed of generating the adjustment instructions based on the moving speed and moving location of the photographing device such that the object at the locations corresponding to the location estimation information sets which include the first position point and the second position point on the trajectory path may be photographed in the images at a matching speed. Another objective may include generating the adjustment instructions based on the target display positions on the target display trajectory path such that the object at the locations corresponding to the location estimation information sets is displayed according to a pre-configured sequence on the trajectory path including the first position point and the second position point. For example, the object is displayed sequentially at various position points on the trajectory path. In another example, the object is displayed at every N number of the position points. A user interface may be configured to receive the user operations and display the images photographed by the photographing device.

In some embodiments, the image photographed by the photographing device may be displayed on a user interface. The user may slide on the user interface to obtain a sliding path. The user may determine a plurality of position points on the sliding path. As the target display positions, the position points may be arranged according to the time sequence of the sliding operation. When the adjustment instructions for adjusting the photographing device are generated, the object at the locations corresponding to the location estimation information sets may be displayed sequentially at the plurality of position points determined by the user on the sliding path.

To ensure that the object at the locations corresponding to the location estimation information sets is displayed at one or more target display positions, the present disclosure provides the following method for calculating an angle required in generating a control instruction.

The specific location is a user designated location or a location where the movable object moves to. The coordinate of the specific location is known. Thus, the method described in the embodiments of the present disclosure may be used to calculate a yaw angle deviation del_yaw, and a pitch angle deviation del_pitch. The yaw angle deviation del_yaw and the pitch angle deviation del_pitch may be used to control the gimbal to rotate, such that the object at the locations corresponding to the location estimation information sets is displayed at the center of the photographed images. To ensure that the object at the location corresponding to the location estimation information is displayed at the target display position, the pixel coordinate (the center position is the origin of the coordinate system) of the target display position may further be used to calculate an angle of the target display position with respect to X-axis (yaw angle) and an angle of the target display position with respect to Y-axis (pitch angle). Thus, the angles required in generating the control instructions includes the yaw angle deviation del_yaw plus the angle of the target display position with respect to the X-axis, and the pitch angle deviation del_pitch plus the angle of the target display position with respect to the Y-axis.

It should be noted that if the smart terminal displaying the image user interface is not a terminal that controls the photographing device, the smart terminal displaying the user interface may send the user designated positions or one or more position points on the sliding path to the terminal that controls the photographing device through some information exchange methods. For example, the smart terminal displaying the image user interface and receiving the user designated positions is a smart phone, and the terminal that controls the photographing device is a motion controller of the movable object. The smart phone may send the corresponding target display position to the motion controller of the movable object. The motion controller may perform other relevant calculations and adjustment controls.

Figure 6:
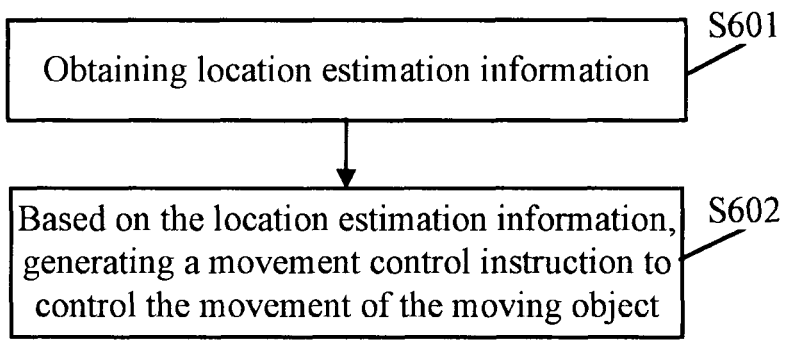
FIG. 6 is a flow chart of an example movement control method according to some embodiments of the present disclosure.

FIG. 6 is a flow chart of an example movement control method according to some embodiments of the present disclosure. The movement control method is similar to the shooting control method in the embodiments described above in connection with FIG. 3 or FIG. 4. After the location estimation information of the target object is obtained, the location estimation information may be used to control movement of the movable object that carries the photographing device. The method of the present disclosure may be implemented by a specialized control device, or a motion controller of the movable object that receives the location estimation information of the target object, such as a flight controller of an unmanned aerial vehicle. Specifically, the method may include the following processes.

S601: location estimation information is obtained. For the location estimation information and the method of calculating the location estimation information, reference may be made to the embodiments described above, and description of which will not be repeated herein.

S602: based on the obtained location estimation information, a movement control instruction is generated to control the movement of the movable object. The movement control instruction is used to control the movable object that carries the photographing device to move around the location corresponding to the location estimation information, such that the shooting location of the movable object is changed.

In some embodiments, based on a circulating flight rule, the movable object may move around the location corresponding to the location estimation information in a circle, a square, a rectangle, or other polygon shapes. The circulating flight rule may be a default configuration or a user defined configuration.

In some embodiments, a target object that needs to be circulated may be designated by the user. The user may select the target object on the user interface of a smart terminal. On the user interface, the photographed image may be displayed. The user may select the target object by clicking a position on the user interface and/or dragging a selection frame to a position on the user interface. After the target object is determined, an information collection including at least two sets of the shooting information may be obtained. The shooting information and the method of obtaining the shooting information may refer to the description in the embodiments of the present disclosure. Further, the information collection may be used to calculate the location estimation information of the target object. Similarly, the method of calculating the location estimation information of the target object may refer to the description in the embodiments of the present disclosure.

After the location estimation information is obtained, the location corresponding to the location estimation information and the shape of the circulating flight path may be used directly to control the movable object to move around the location corresponding to the location estimation information. In some embodiments, the location estimation information of the target object may be quickly determined to make the circulating movement more automatic and intelligent.

In the embodiments of the present disclosure, the method of estimating the location of the target object not in motion or moving in a substantially slow speed and the continuous photographing are described. When the movable object such as the unmanned aerial vehicle is in a rapid tangential motion with respect to the target object, the location estimation of the moving target object may be performed by assuming no substantial acceleration or de-acceleration. The location change of the target object may be obtained by observing the target object at a certain distance or angle interval. However, because the actual moving speed and moving direction are still unknown, the observed locations of the target object are unreliable. Thus, a state estimation method may be used to recover the true target moving equation based on the unreliable location observations.

A common and practical state estimation method uses Kalman filters. In this case, a movement model assuming that the acceleration of the target is Gaussian noise can be designed. In this movement module, the target object does not make sudden moves. After being iterated over a period of time, the target state equation may be eventually converged to the true movement equation.

In the embodiments of the present disclosure, the shooting location and the shooting angle may be used to calculate the location estimation of the target object that is continuously photographed. The location estimation is then used to obtain the location estimation information to adjust the shooting orientation of the photographing module. The method is simple and straightforward to implement. The method is effective in resolving the problem of the image recognition operation failure due to the target object being shielded. The efficiency in shooting the target object is improved. Moreover, after the corresponding location of the target object is determined, other movement functions such as circular flying may be performed based on the location of the target object.

The present disclosure also provides a computer storage medium. The computer storage medium stores the program instructions. When the program instructions are executed, the methods of various embodiments of the present disclosure are performed.

The shooting control apparatus and control device according to some embodiments of the present disclosure are described in detail below.

Figure 7:
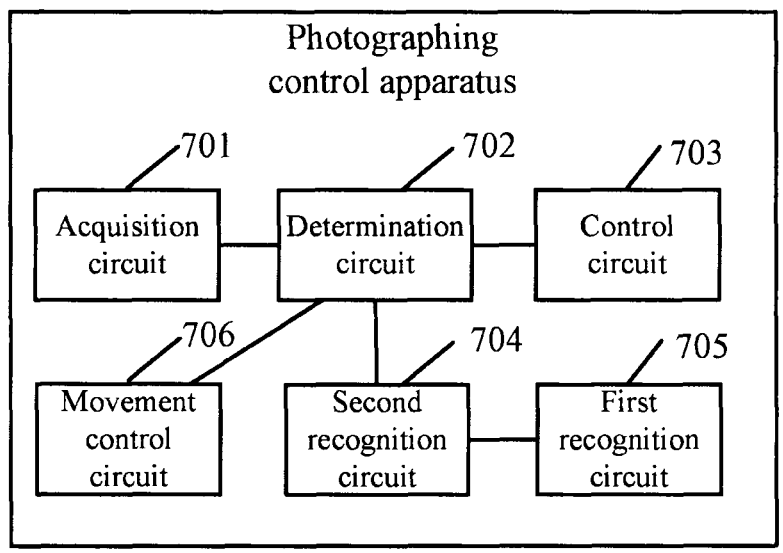
FIG. 7 is a schematic diagram of an example photographing control apparatus according to some embodiments of the present disclosure.

FIG. 7 is a schematic diagram of an example photographing control apparatus according to some embodiments of the present disclosure. The apparatus of the present disclosure may be implemented in a standalone control device, a motion controller, or a gimbal controller. In some embodiments, as shown in FIG. 7, the apparatus includes an acquisition circuit 701, a determination circuit 702, and a control circuit 703.

The acquisition circuit 701 is configured to obtain an information collection including at least two sets of shooting information. The shooting information includes shooting location information and shooting angle information when the target object is photographed. The determination circuit 702 is used to determine the location estimation information of the target object based on at least two sets of the shooting information selected from the information collection. The shooting location information of the selected shooting information sets correspond to different locations. The control circuit 703 is configured to adjust the photographing device based on the shooting adjustment instruction generated from the location estimation information. The shooting adjustment instruction is used to adjust the shooting angle of the photographing device, such that the location corresponding to the location estimation information falls within the viewing angle of the photographing device.

In some embodiments, the determination circuit 702 may determine at least two sets of initial location estimation information based on at least three sets of shooting information. The initial location estimation information sets are checked against a pre-configured stability condition. If the stability condition is satisfied, the initial location estimation information is used to determine the location estimation information of the target object.

In some embodiments, the apparatus further includes a second recognition circuit 704. When the stability condition is not satisfied, an image recognition technology is used to recognize the target object in the photographed image, such that the target object can be continuously photographed.

In some embodiments, the determination circuit 702 is further configured to determine that the stability condition is satisfied when a location change magnitude between the corresponding locations in at least two sets of initial location estimation information satisfies a pre-configured change magnitude requirement.

In some embodiments, the apparatus further includes a first recognition circuit 705 configured to perform an image recognition process to recognize the target object in the photographed image. When the target object is recognized, the target object continues to be photographed. When the target object is not recognized, the determination circuit 702 is notified.

Figure 8:
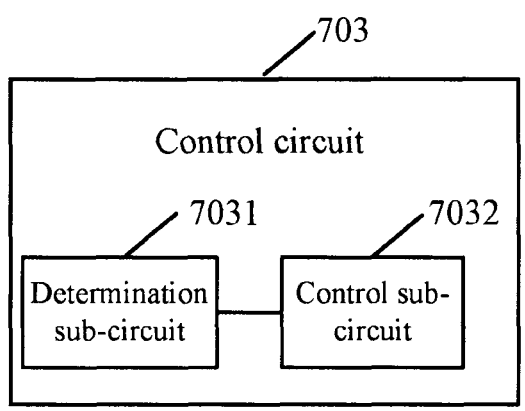
FIG. 8 is a schematic diagram of an example control circuit in FIG. 7.

In some embodiments, the shooting adjustment instruction is used to adjust the shooting angle when the photographing device is at a specific location. As shown in FIG. 8, the control circuit 703 includes a determination sub-circuit 7031 configured to determine a target display position of the target object in the image and a control sub-circuit 7032 configured to generate a shooting adjustment instruction based on the target display position, the location estimation information, and the specific location. The shooting adjustment instruction is used to adjust the shooting angle of the photographing device such that when the photographing device is at the specific location, the location corresponding to the location estimation information falls within the viewing angle of the photographing device and the object at the location corresponding to the location estimation information is displayed at the target display position in the photographed image.

In some embodiments, the determination sub-circuit 7031 is further configured to select a position in the image as the target display position. After the shooting angle of the photographing device is adjusted according to the shooting adjustment instruction, the object at the location corresponding to the location estimation information is persistently displayed at the target display position in the photographed image.

In some embodiments, the determination sub-circuit 7031 is further configured to select a position point on a trajectory path drawn in the image as the target display position. As the target display position, the position point includes at least a first position point and a second position point.

The control sub-circuit 7032 is configured to generate at least a first shooting adjustment instruction corresponding to the first position point and a second shooting adjustment instruction corresponding to the second position point based on a pre-configured generation policy, the location estimation information, and the specific location. The first shooting adjustment instruction and the second shooting adjustment instruction are used to adjust the shooting angle of the photographing device, such that the object at the location corresponding to the location estimation information is sequentially displayed at the first position point and the second position point in the photographed image.

In some embodiments, the pre-configured generation policy is determined by a moving speed of the photographing device, a moving location of the photographing device, and one or more of the position points on the trajectory path, selected as the target display positions.

In some embodiments, the apparatus further includes a movement control circuit 706 used to generate movement control instruction to control the movement of the movable object that carries the photographing device based on the location estimation information. The movement control instruction is used to control the movable object that carries the photographing device to move around the location corresponding to the location estimation information, such that the shooting location of the movable object is changed.

In some embodiments, the photographing device is mounted on the movable object through a gimbal. The shooting location information includes the collected location coordinate information of the movable object. The shooting angle information includes the attitude information of the gimbal and the location information when the target object is photographed.

In some embodiments, the rule for selecting the at least two sets of the shooting information from the information collection by the determination circuit 702 includes that the shooting location information in the shooting information is used to calculate a separation distance to select the shooting information, and/or the shooting angle information in the shooting information is used to calculate a separation angle to select the shooting information.

Specifically, for the implementation of the circuits and the sub-circuits of the apparatus according to the present disclosure, reference may be made to the description of the example methods described above in connection with FIGS. 1-6, and description thereof will not be repeated herein.

In the embodiments of the present disclosure, the shooting location and the shooting angle may be used to calculate the location estimation of the target object that is continuously photographed. The location estimation is then used to obtain the location estimation information to adjust the shooting orientation of the photographing module. The method is simple and straightforward to implement. The method is effective in resolving the problem of the image recognition operation failure due to the target object being shielded. The efficiency in shooting the target object is improved. Moreover, after the corresponding location of the target object is determined, other movement functions such as circular flying may be performed based on the location of the target object.

Figure 9:
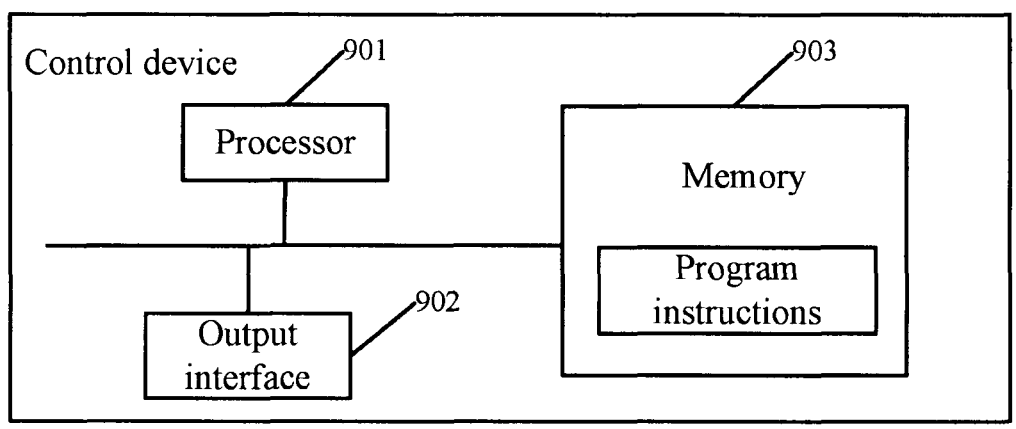
FIG. 9 is a schematic diagram of an example control device according to some embodiments of the present disclosure.

FIG. 9 is a schematic diagram of an example control device according to some embodiments of the present disclosure. The control device may be a specialized device that controls the shooting angle of the photographing device through digitally communicating with other movable object such as an unmanned aerial vehicle and other device such as a smart gimbal. The control device may also be a motion controller of the movable object, such as a flight controller of the unmanned aerial vehicle. The motion controller digitally communicates with the other device such as the gimbal to control the shooting angle of the photographing device. The control device may also be a controller of other device such as the gimbal, which controls the shooting angle of the photographing device by digitally communicating the movable object.

The control device may include a power supply circuit and various interface circuits. In some embodiments, as shown in FIG. 9, the control device includes a processor 901, an output interface 902, and a memory 903. The processor 901, the output interface 902, and the memory 903 may be digitally connected through signal buses.

The memory 903 may be a volatile memory such as random-access memory (RAM). The memory 903 may also be a non-volatile memory such as flash memory, hard disk drive (HDD), or solid-state drive (SSD). The memory 903 may be a combination of various types of memories.

The processor 901 may be a central processing unit (CPU). The processor 901 may further include a hardware chip. The hardware chip may be an application-specific integrated circuit (ASIC), a programmable logic device (PLD), or a combination of both. The programmable logic device (PLD) may be a complex programmable logic device (CPLD), a field-programmable gate array (FPGA), a generic array logic (GAL), or any combination thereof.

In some embodiments, the memory 903 may also store program instructions that can be executed by the processor 901 to perform a method consistent with the disclosure, such as one of the example methods described above. For example, the memory 903 may store program instructions used to obtain an information collection including at least two sets of shooting information. The shooting information includes shooting location information and shooting angle information when the target object is photographed. At least two sets of the shooting information may be selected from the information collection to location estimation information of the target object. The shooting location information in the selected shooting information sets correspond to different locations. A shooting adjustment instruction is generated to adjust the photographing device based on the location estimation information. The shooting adjustment instruction is used to adjust the shooting angle of the photographing device, such that the location corresponding to the location estimation information falls within the viewing angle of the photographing device. The output interface 902 is configured to output the adjustment instruction to adjust the photographing device.

In some embodiments, the processor 901 may be configured to determine at least two sets of initial location estimation information based on at least three sets of shooting information. The initial location estimation information sets are checked against a pre-configured stability condition. If the stability condition is satisfied, the initial location estimation information is used to determine the location estimation information of the target object.

In some embodiments, the processor 901 is further configured to, when the stability condition is not satisfied, recognize the target object in the photographed image, such that the target object is continuously photographed.

In some embodiments, the processor 901 is further configured to determine the stability condition is satisfied when a location change magnitude between the corresponding locations in at least two sets of initial location estimation information satisfies a pre-configured change magnitude requirement.

In some embodiments, the processor 901 is further configured to perform an image recognition process to recognize the target object in the photographed image. When the target object is recognized, the target object continues to be photographed. When the target object is not recognized, the determined location estimation information of the target object is executed.

In some embodiments, the shooting adjustment instruction is used to adjust the shooting angle when the photographing device is at a specific location. The processor 901 is further configured to determine a target display position of the target object in the image and generate a shooting adjustment instruction based on the target display position, the location estimation information, and the specific location. The shooting adjustment instruction is used to adjust the shooting angle of the photographing device such that when the photographing device is at the specific location, the location corresponding to the location estimation information falls within the viewing angle of the photographing device and the object at the location corresponding to the location estimation information is displayed at the target display position in the photographed image.

In some embodiments, the processor 901 is further configured to select a position in the image as the target display position. After the shooting angle of the photographing device is adjusted according to the shooting adjustment instruction, the object at the location corresponding to the location estimation information is persistently displayed at the target display position in the photographed image.

In some embodiments, the processor 901 is further configured to select a position point on a trajectory path drawn in the image as the target display position. As the target display position, the position point includes at least a first position point and a second position point. The processor 901 is further configured to generate at least a first shooting adjustment instruction corresponding to the first position point and a second shooting adjustment instruction corresponding to the second position point based on a pre-configured generation policy, the location estimation information, and the specific location. The first shooting adjustment instruction and the second shooting adjustment instruction are used to adjust the shooting angle of the photographing device, such that the object at the location corresponding to the location estimation information is sequentially displayed at the first position point and the second position point in the photographed image.

In some embodiments, the pre-configured generation policy is determined by a moving speed of the photographing device, a moving location of the photographing device, and one or more of the position points on the trajectory path, selected as the target display positions.

In some embodiments, the processor 901 is further configured to generate movement control instruction to control the movement of the movable object that carries the photographing device based on the location estimation information. The movement control instruction is used to control the movable object that carries the photographing device to move around the location corresponding to the location estimation information, such that the shooting location of the movable object is changed.

In some embodiments, the photographing device is mounted on the movable object through a gimbal. The shooting location information includes the collected location coordinate information of the movable object. The shooting angle information includes the attitude information of the gimbal and the location information when the target object is photographed.

In some embodiments, the rule used by the processor 901 for selecting the at least two sets of the shooting information from the information collection includes that the shooting location information in the shooting information is used to calculate a separation distance to select the shooting information, and/or the shooting angle information in the shooting information is used to calculate a separation angle to select the shooting information.

For the implementation of the processor 901 according to the present disclosure, reference may be made to the description of the methods and functions in the embodiments described above in connection with FIGS. 1-6, and the description thereof will not be repeated herein.

In the embodiments of the present disclosure, the shooting location and the shooting angle may be used to calculate the location estimation of the target object that is continuously photographed. The location estimation is then used to obtain the location estimation information to adjust the shooting orientation of the photographing module. The method is simple and straightforward to implement. The method is effective in resolving the problem of the image recognition operation failure due to the target object being shielded. The efficiency in shooting the target object is improved. Moreover, after the corresponding location of the target object is determined, other movement functions such as circular flying may be performed based on the location of the target object.

It should be understood by those skilled in the art that all or part of the processes in implementing the methods of the foregoing embodiments may be performed by a computer program to instruct the relevant hardware. The program may be stored in a computer readable storage medium. When the program is executed, the flow chart of any method in the foregoing embodiments may be supported. The storage medium may be a magnetic disk, an optical disk, a read-only memory (ROM), or a random access memory (RAM).

The above description is only about some embodiments of the present disclosure, and is not intended to limit the scope of the present disclosure. Those having ordinary skill in the art may appreciate various modifications and changes. Any modifications, equivalent substitutions, and improvements made within the spirit and principle of the present disclosure should be included in the scope of the present disclosure.

What is claimed is:

1. A method comprising:
    obtaining a photographed image from a photographing device carried by a movable object;
    determining a target object in the photographed image to track the target object;
    determining location estimation information of the target object based on shooting information of the photographing device; and
    in response to a disappearance of the target object in the photographed image, controlling the photographing device to search for the target object around a location associated with the location estimation information.

2. The method according to claim 1, wherein the shooting information includes shooting location information and shooting angle information.

3. The method according to claim 2, wherein:
    the shooting location information is location information of the photographing device when the photographing device photographs the target object and is determined based on location coordinate information of the movable object; and
    the shooting angle information is orientation of the target object relative to the photographing device when the photographing device photographs the target object and is determined based on attitude information of the photographing device and position information of the target object in the photographed image.

4. The method according to claim 1, further comprising:
    determining whether an image of the target object is a satisfactory object image:
        in response to determining the image of the target object to be the satisfactory target object image, recording shooting information corresponding to the satisfactory target object image; and
        in response to determining the image of the target object not to be the satisfactory target object image, proceeding to determine the location estimation information for the target object.

5. The method according to claim 4, further comprising:
    obtaining a plurality sets of shooting information for the photographing device;
    determining, based on at least two sets of shooting information selected from the plurality sets of shooting information, the location estimation information for the target object, shooting location information in the at least two sets of shooting information corresponding to different locations;
    generating, based on the location estimation information, a shooting adjustment instruction; and
    adjusting a shooting angle of the photographing device according to the shooting adjustment instruction to place a location corresponding to the location estimation information within a viewing angle of the photographing device.

6. The method according to claim 5, wherein determining the location estimation information includes:
    determining, based on at least three sets of shooting information selected from the plurality sets of shooting information, a plurality sets of initial location estimation information for the target object; and
    checking the plurality sets of initial location estimation information against a pre-configured stability condition:

in response to the stability condition being satisfied, determining the location estimation information based on the at least two sets of initial location estimation information; and in response to the stability condition not being satisfied, determining the target object in the photographed image.

7. The method according to claim 1, wherein controlling the photographing device to search for the target object around the location includes controlling the movable object to move to cause the photographing device to move around the location.

8. The method according to claim 1, wherein controlling the photographing device to search for the target object around the location includes controlling a gimbal carrying the photographing device to move to cause the photographing device to move around the location.

9. The method according to claim 1, wherein controlling the photographing device to search for the target object around the location includes controlling the photographing device to keep the location within a viewing angle of the photographing device.

10. The method according to claim 1, wherein controlling the photographing device to search for the target object around the location includes controlling the photographing device to move around the location based on a circulating flight rule.

11. The method of claim 10, wherein the circulating flight rule is a default configuration or a user defined configuration.

12. The method of claim 1, wherein the disappearance of the target object is caused by at least one of the target object being shielded by another object, the movable object moving to a location far away from the target object, bright light irradiating on a lens of the photographing device, or an image recognition circuit of the photographing device becoming faulty.

13. The method of claim 1, further comprising:
in response to the target object not being identified, sending an alert message to notify a terminal user of loss of the target object.

14. A method comprising:
obtaining a photographed image from a photographing device carried by a movable object;
determining a target object in the photographed image to track the target object;
determining location estimation information of the target object based on shooting information of the photographing device; and
in response to a disappearance of the target object in the photographed image, controlling the photographing device to keep a location associated with the location estimation information within a viewing angle of the photographing device.

15. The method according to claim 14, wherein the shooting information includes:
shooting location information that is location information of the photographing device when the photographing device photographs the target object and is determined based on location coordinate information of the movable object; and
shooting angle information that is orientation of the target object relative to the photographing device when the photographing device photographs the target object and is determined based on attitude information of the photographing device and position information of the target object in the photographed image.

16. The method according to claim 14, further comprising:
determining whether an image of the target object is a satisfactory object image:
in response to determining the image of the target object to be the satisfactory target object image, recording shooting information corresponding to the satisfactory target object image; and
in response to determining the image of the target object not to be the satisfactory target object image, proceeding to determine the location estimation information for the target object.

17. The method according to claim 16, further comprising:
obtaining a plurality sets of shooting information for the photographing device;
determining, based on at least two sets of shooting information selected from the plurality sets of shooting information, the location estimation information for the target object, shooting location information in the at least two sets of shooting information corresponding to different locations;
generating, based on the location estimation information, a shooting adjustment instruction; and
adjusting a shooting angle of the photographing device according to the shooting adjustment instruction to place a location corresponding to the location estimation information within a viewing angle of the photographing device.

18. The method according to claim 17, wherein determining the location estimation information includes:
determining, based on at least three sets of shooting information selected from the plurality of sets of shooting information, a plurality sets of initial location estimation information for the target object; and
checking the plurality sets of initial location estimation information against a pre-configured stability condition:
in response to the stability condition being satisfied, determining the location estimation information based on the at least two sets of initial location estimation information; and
in response to the stability condition not being satisfied, determining the target object in the photographed image.

19. The method according to claim 17, wherein generating the shooting adjustment instruction includes:
determining a target display position for the target object in an image; and
generating the shooting adjustment instruction based on the target display position, the location estimation information, and a location of the photographing device.

20. The method according to claim 19, wherein determining the target display position includes:
designating a position in the image as the target display position; and
persistently displaying an object at a location corresponding to the location estimation information at the target display position in the photographed image after the shooting angle of the photographing device is adjusted according to the shooting adjustment instruction.

* * * * *